United States Patent [19]
Dotzer et al.

[11] Patent Number: 4,887,423
[45] Date of Patent: Dec. 19, 1989

[54] METHOD FOR TINTING AND FURTHER PROCESSING OF AT LEAST ONE LIGHT WAVEGUIDE

[75] Inventors: Peter Dotzer, Munich; Heinz Glaser, Germering; Reinhold Hahn, Munich; Ernst Mayr, Starnberg, all of Fed. Rep. of Germany

[73] Assignee: Siemens Aktiengesellschaft, Berlin and Munich, Fed. Rep. of Germany

[21] Appl. No.: 322,116

[22] Filed: Mar. 13, 1989

[30] Foreign Application Priority Data

Mar. 22, 1988 [DE] Fed. Rep. of Germany ....... 3809608

[51] Int. Cl.$^4$ .................... G02B 6/04; G02B 6/44; D01H 13/30
[52] U.S. Cl. ................................ 57/295; 57/6; 57/7; 57/313; 350/96.23; 350/96.24
[58] Field of Search ............. 57/6, 7, 13, 15, 295–297, 57/313, 352; 350/96.23, 96.24

[56] References Cited

U.S. PATENT DOCUMENTS

| | | | |
|---|---|---|---|
| 2,944,383 | 7/1960 | Lawrence et al. | 57/313 X |
| 3,458,983 | 8/1969 | Hamel | 57/313 X |
| 3,722,203 | 3/1973 | Akachi | 57/313 X |
| 4,458,476 | 7/1984 | Mayr et al. | 57/7 X |
| 4,615,168 | 10/1986 | Oestreich | 57/7 |
| 4,689,943 | 9/1987 | Einsle et al. | 57/6 X |

*Primary Examiner*—John Petrakes
*Attorney, Agent, or Firm*—Hill, Van Santen, Steadman & Simpson

[57] ABSTRACT

In the processing of light waveguides, a method uses an overhead haul-off from a first supply reel to apply a pre-twist to the light waveguide, which is preserved during a tinting operation and while the tinted waveguide is wound in a tangential direction on a second supply reel. During further processing, in acordance with the present method, the waveguide is taken off by an overhead haul-off process from the second supply reel in a direction of haul-off which is opposite to the direction during the first overhead haul-off so that the twist produced by the second overhead haul-off is in an opposite direction and compensates for the twist produced during the first overhead haul-off operation.

4 Claims, 1 Drawing Sheet

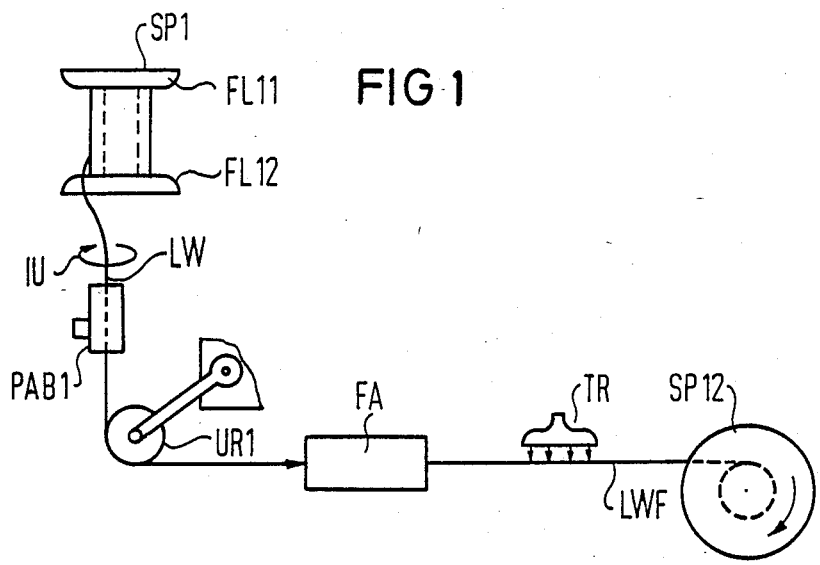
FIG 1
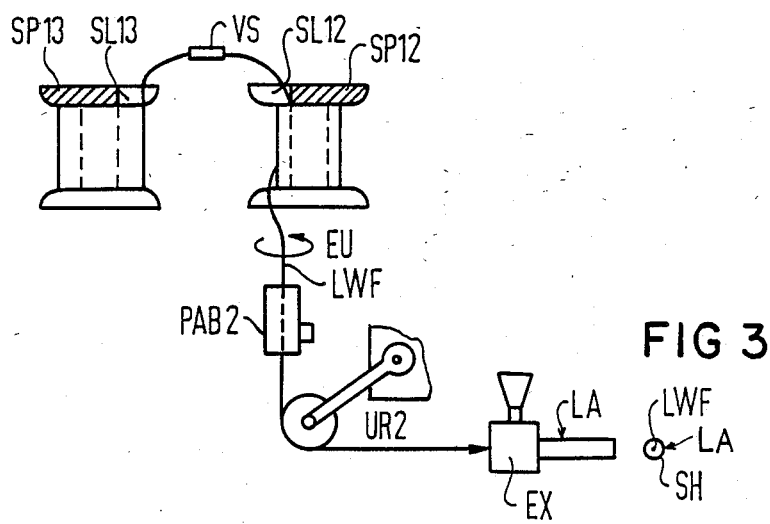
FIG 2
FIG 3

METHOD FOR TINTING AND FURTHER PROCESSING OF AT LEAST ONE LIGHT WAVEGUIDE

BACKGROUND OF THE INVENTION

The present invention is directed to a method for the tinting and further processing of at least one tinted light waveguide for the manufacture of either a light waveguide bundle, a light conducting lead or an optical cable.

A method for tinting light waveguides is disclosed in U.S. Pat. No. 4,629,285, whose disclosure is incorporated by reference thereto and which was the basis of European Patent Specification No. 0 155 092. As disclosed in this patent, a first supply reel is provided, from which the light waveguide to be tinted is drawn off in a tangential direction and, thus, free of any twist or torsion. After implementation of the tinting process, the tinted light waveguide is, again, tangentially wound onto a driven, second supply reel.

German Published Application No. 34 14 396 discloses a process in which a light waveguide is hauled-off overhead from a supply reel; which means that the waveguide is pulled off along the axis of the reel. As disclosed in this reference, difficulties can occur in the region between the haul-off and the following additional processing devices, for example, a stranding unit or the like, because the overhead haul-off produces a torsion or twist of the light waveguides. In particular, there is always the risk that disturbing loops will be formed which will lead to a ripping or tearing of the light waveguide. In order to counter this difficulty, the German reference uses superimposed, uniform rotation of the light waveguide to counteract the twist produced by the haul-off. In the German reference, this is accomplished by two rollers, which are additionally applied and which rotate in opposite directions as they grip the fiber that passes therebetween, and the pair of rollers are also rotate on the axis of the fiber to perform a twisting action to the fiber. The size of this rotation on the axis is selected to be approximately such that it corresponds to the haul-off rotation and practically compensates the latter due to its opposite direction.

SUMMARY OF THE INVENTION

The object of the present invention is to assure a largely torsion-free processing of light waveguides in an especially simple way, even given overhead haul-off. In accordance with the invention is directed to a method of the species initially cited, wherein the light waveguide that has not yet been tinted is hauled-off overhead from a first supply reel in a first direction, the light waveguide is then tinted while preserving the twist formed by the haul-off and is wound onto a driven second supply reel in a tangential direction. Subsequently, the tinted light waveguide on the second supply reel is subjected to a further processing step, wherein it is hauled-off overhead from the second supply reel for the additional or further process and the direction of haul-off from the second supply reel is opposite to the first-mentioned direction so that the twist formed in the fiber from the first haul-off operation is cancelled by the opposite twist produced in the second haul-off operation.

Whereas the tinting process has heretofore been considered as a work step completely separate from the following additional processing, the invention here embarks upon a completely different route in that it already provides an overhead haul-off during the tinting process. Compared to normal haul-offs, because they are driven from supply reels, this already produces a simplification in the tinting region because the reel itself is no longer moved in the overhead haul-off operation. Simultaneously, the tangential winding onto the second supply reel at the end of the tinting process guarantees that the twist or torsion established by the overhead haul-off in the tinting process is preserved. During the following, second overhead haul-off in the opposite direction during the additional processing of the light waveguide, an extensive or complete compensation of the initial twist occurs so that the light waveguide in the final product, for example, a light waveguide lead or a light waveguide cable, is present in a torsion-free and twist-free condition. The invention, thus, makes it both possible to simplify the tinting process as well as to make use of the overhead haul-off twice, which use of the overhead haul-off reduces the cost and, nonetheless, simultaneously guarantees that the light waveguides no longer exhibit practically any twist at the end of the processing event.

Other features of the invention will be readily apparent from the following description of the preferred embodiments, the drawings and claims.

BRIEF DESCRIPTION OF THE DRAWINGS

FIG. 1 is a schematic view of a tinting process in accordance with the present invention;

FIG. 2 is a schematic view of an additional processing of the tinted waveguide; and FIG. 3 is an end view of the product being produced by the additional process of FIG. 2.

DESCRIPTION OF THE PREFERRED EMBODIMENT

The principles of the present invention are particularly useful in producing a light conducting lead, generally indicated at LA in FIG. 3, which is composed of a light waveguide LWF in a protective sheath SH.

To produce the light conducting lead LA of FIG. 3, an apparatus schematically illustrated in FIG. 1 is required. This apparatus has a first supply reel SP1, from which a light waveguide LW is hauled-off overhead or along the axis of the reel or spool SP1. In order to facilitate this overhead haul-off, the flanges FL11 and FL12 of the supply reel SP1 are correspondingly rounded off or shaped and, in any case, deburred and fashioned to provide good sliding guide surfaces. The haul-off of the light waveguide present on the reel or spool SP1 is carried out overhead, namely in a clockwise direction, for example, as indicated by the arrow IU. Due to this overhead haul-off, the light waveguide LW is provided with a torsion or twist, whose direction is defined by the arrow IU.

Since the haul-off of the light waveguide LW from the supply reel SP1 optimally occurs largely powerless and, on the other hand, the haul-off must insure such that no torsion inhibit, i.e., no elimination of the torsion, occurs during further process, a pneumatic braking unit having a brake power of 5 cN is expediently utilized. This brake unit is PAB1. An example of a brake unit that can be used for the unit PAB1 is disclosed in U.S. Pat. No. 4,702,404, whose disclosure is incorporated by reference and was based on German Patent Application No. 34 09 376. This U.S. patent discloses a guide and haul-off means that is especially gentle on the light waveguide and that does not cancel the torsion. What is thereby essentially involved is a T-shaped member having a through inside bore and having a flowing agent, for example air, flowing along the light waveguide and out both ends. The size of the bore on one end of the T-member is different than that of the other so that a greater flow is in one direction than the other, and this results in applying a force which can either accelerate or decelerate the fiber, depending on the particular position of the bore. Simultaneously, this means that it will produce a steadying of the fiber, given overhead haul-off, will avoid the loop formations and will guide the fiber exactly through the optical measuring cell, which acts as a tear monitor. If the torsion were not forwarded at this location of the device PAB1, then it would build up at this point until the fiber forms a loop and becomes either kinked or torn.

The light waveguide, after passing through the unit PAB1, is brought into a desired direction by a deflection roller UR1. The deflection roller can also be constructed as a monitoring means for the fiber tears.

The light waveguide LW, provided with the pretwist or torsion, in this way enters into a tinting means FA1 constructed in a known fashion, such as disclosed in the earlier U.S. Pat. No. 4,629,285. In the tinting means FA1, the light waveguide is provided with appropriate coating that is normally applied in a liquid form to form a tinted light waveguides LWF. A drying of the tinted light waveguide LWF is subsequently carried out, such as with a drying unit TR, which could be either hot air or some curing device. After the tinted light waveguide LWF has been dried, it is wound onto a second supply reel or spool SP12 in a tangential direction so that no additional torsions or twists occur during the wind-up itself and the pretwisting produced by the overhead haul-off from the supply reel SP1 is preserved on this second supply reel SP12.

The additional processing of the tinted light waveguides LWF, for example by either stranding, introducing into a protective sheath, surrounding with an outside cladding, or etc., should optimally occur interruption-free. An overhead haul-off from a supply reel is especially advantageous for this purpose because additional supply reels can then be kept ready, whereby the end of the first supply reel is already connected to the starting end of the following reel in advance. As illustrated in FIG. 2, an example of this is shown by the two supply reels SP12 and SP13. Tinted light waveguides are present on both reels and the end of the tinted light waveguide and the supply reel SP12 is connected to the start of the tinted light waveguide on the supply reel SP13 by a connecting location VS. Such a connection can be produced in an especially simple way when appropriate radial slots are provided in the region of the flanges, particularly in the upward position part of the reels, as indicated by the slots SL13 and SL12.

It is assumed that the reel SP12 in FIG. 2 is identical to the reel SP12 of FIG. 1 and that the tinted light waveguide which is wound on the reel SP12 is provided with a pretorsion or pretwist in the clockwise direction. The overhead haul-off from the reel SP12 in the additional process step is now undertaken in a counter-clockwise direction, as indicated by the arrow EU. What is thereby achieved is that the pretwist or torsion of the optical waveguide LWF of FIG. 1, which occurred under identical circumstances, is completely or largely compensated in the overhead haul-off in a counter-clockwise direction during the second haul-off occurring in the further processing of FIG. 2. The tinted light waveguide LWF enters into a braking and haul-off means PAB2 that is constructed similar to the haul-off means PAB1 of FIG. 1. After passing a deflection roller UR2, the light waveguide LWF that is now torsion-free or twist-free is supplied for further processing. It is assumed in the present example that a protective sheath SH is to be applied on the light waveguide LWF with an extruder EX so that a light conducting lead, generally indicated at LA, will be produced. However, it is also possible that the following processing event comprises a stranding process of light waveguides or some other type of cladding process or some other additional processing steps.

By connecting a plurality of supply reels SP12 and SP13 in succession according to FIG. 2, either light waveguide cables, stranded units or the like can be manufactured and exhibit lengths greater than 20 km. The winding force of the light waveguide in the region of the reel should like on the order of magnitude of 30 cN. In the processing, both within the framework of the tinting event or process, as well as the additional processing of FIG. 2, care should be exercised to see that the processing steps themselves do not, in turn, apply or supply an additional torsion or twist of the light waveguide, for example due to unsuitable roller guidance or the like. These additional torsions would add to the existing torsions and, for example, a fiber tearing or the like could occur, given the overhead haul-off of the light waveguides according to the arrangement illustrated in FIG. 2.

Although various minor modifications may be suggested by those versed in the art, it should be understood that we wish to embody within the scope of the patent granted hereon all such modifications which reasonably and properly come within the scope of our contribution to the art.

We claim:

1. A method for the tinting and further processing of at least one tinted light waveguide for the manufacture of a light waveguide device, said process comprising the steps of a first hauling-off of a light waveguide with an overhead haul-off in a first direction from a first supply reel, preserving a haul-off twist applied to the light waveguide during the first hauling-off and tinting the hauled-off light waveguide, winding the tinted light waveguide in a tangential direction on a power-driven second supply reel, performing a second hauling-off with an overhead haul-off from the second supply reel to provide the tinted waveguide for further processing, said second hauling-off being in a second direction which is opposite to the first direction so that the torsion produced in the second overhead hauling-off cancels the torsion and twist produced by the first hauling-off.

2. A method according to claim 1, wherein the first hauling-off during the tinting event and the second overhead hauling-off during the further processing is undertaken so that the torsion on the light waveguide occurring during each of these overhead haul-offs take full effect.

3. A method according to claim 1, wherein the step of tinting the light waveguide is undertaken so that no additional torsion of the light waveguide is added to the torsion produced by the first overhead haul-off.

4. A method according to claim 3, wherein the first overhead haul-off and the second overhead haul-off are undertaken so that the torsion applied to the light waveguide during each of the haul-off steps takes full effect.

* * * * *